United States Patent [19]
Jones et al.

[11] Patent Number: 5,276,298
[45] Date of Patent: Jan. 4, 1994

[54] APPARATUS AND METHOD FOR LASER JOINING BIMETALLIC MATERIALS TO CIRCUIT BREAKER TERMINALS AND BRAID EXTENSIONS

[75] Inventors: Marshall G. Jones, Scotia, N.Y.; Jose A. Solero, San German, P.R.; Joseph Criniti, New Britain, Conn.

[73] Assignee: General Electric Company, Schenectady, N.Y.

[21] Appl. No.: 936,996

[22] Filed: Aug. 31, 1992

[51] Int. Cl.⁵ .............................................. B23K 26/00
[52] U.S. Cl. .............................. 219/121.63; 219/121.64
[58] Field of Search ...................... 219/121.63, 121.64; 29/860

[56] References Cited

U.S. PATENT DOCUMENTS

| | | | |
|---|---|---|---|
| 3,908,110 | 9/1975 | Heft | 219/121.85 |
| 3,953,812 | 4/1976 | Heft et al. | 335/23 |
| 4,274,043 | 6/1981 | Heitz | 320/6 |
| 4,926,022 | 5/1990 | Freedman | 219/121.63 |
| 5,093,988 | 3/1992 | Becker | 219/121.64 X |

Primary Examiner—C. L. Albritton
Attorney, Agent, or Firm—Paul R. Webb, II

[57] ABSTRACT

Laser joining of dissimilar material in order to form an integral structure. Such structure of this type, generally, allow circuit breaker components which are constructed of different material, to be joined together to form an integral circuit breaker.

7 Claims, 1 Drawing Sheet

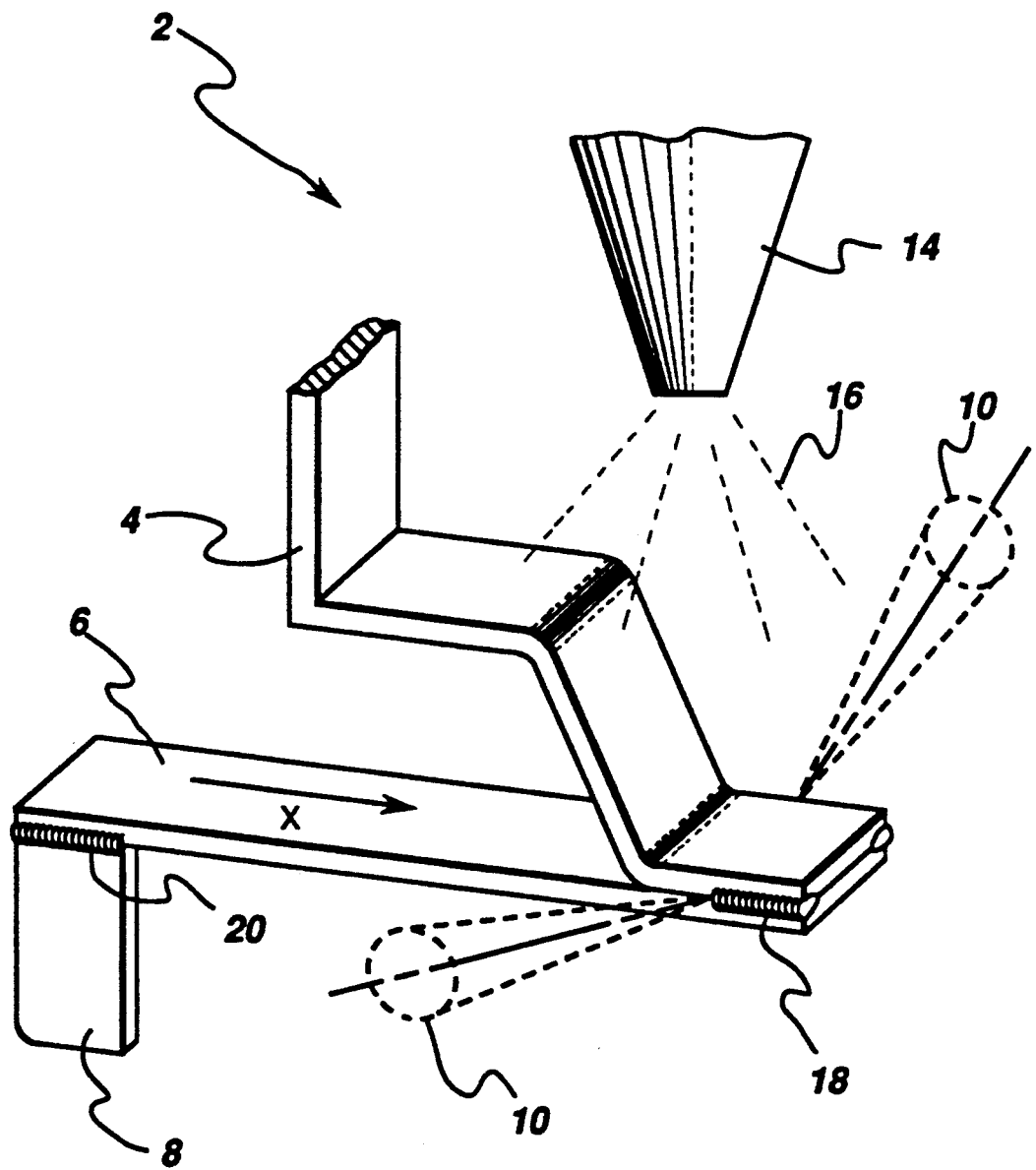

APPARATUS AND METHOD FOR LASER JOINING BIMETALLIC MATERIALS TO CIRCUIT BREAKER TERMINALS AND BRAID EXTENSIONS

BACKGROUND OF THE INVENTION

1. Field of the Invention

This invention relates to the laser joining of dissimilar materials in order form an integral structure. Such structures of this type, generally, allow circuit breaker components, which are constructed of different materials, to be joined together to form an integral circuit breaker.

2. Description of the Related Art

The current process for joining dissimilar material components is projection welding, a form of resistance welding. In this case, the terminal and braid extension components, which are made of bronze and brass, respectively, have their mating parts dimpled to help direct the current to a specific location during the projection welding process. The dimples provide a region for high current densities to form and pressure contact points where the welds are actually made. With properly dressed electrodes, sufficient pressure, and adequately cleaned joints, a reliable weld can be made. But, since these conditions are not always maintained in a manufacturing element, product yield can be inconsistent and very low at times. This is particularly the case if the shape of the electrodes are not maintained. Therefore, it would be advantageous if the amount of weld yield could be increased.

It is apparent from the above that there exists a need in the art for a welding system which is capable of welding dissimilar materials, and which at the same time can produce a high amount of yield. It is a purpose of this invention to fulfill this and other needs in the art in a manner more apparent to the skilled artisan once given the following disclosure.

SUMMARY OF THE INVENTION

Generally speaking, this invention fulfills these needs by providing an apparatus for joining circuit breaker components, comprising a circuit breaker terminal means, a braid extension means located at a predetermined distance away from said terminal means, a bimetal connection means located between said terminal means and said extension means, a laser means and a first and second joint means wherein said first joint means is substantially located between said terminal means and said bimetal connection means such that said first joint means is formed by said laser means and is constructed substantially of a portion of said terminal means and a portion of said bimetal connection means and said second joint means is substantially located between said braid extension means and said bimetal connection means such that said second joint means is formed by said laser means and is constructed substantially of a portion of said extension means and a portion of said bimetal connection means.

In certain preferred embodiments, the circuit breaker terminal means is constructed of phosphor bronze. Also, the braid extension means is constructed of tinned or non-tinned brass. Also, the connection means is constructed of a nickel(34)-iron(64)-nickel based alloy bimetal. Finally, the laser means is a Nd:YAG laser with and without a fiber optic beam delivery system.

In another preferred embodiment, structurally sound dissimilar material welded joints are formed with a noncontact welding technique in a quick and efficient manner.

The preferred dissimilar material joining system, according to this invention, offers the following advantages: increased yield; excellent weldment characteristics; good durability; good stability; good economy; and high strength for safety. In fact, in many of the preferred embodiments, these factors of increased yield and excellent weldment characteristics are optimized to an extent that is considerably higher than heretofore achieved prior, known bimetallic joining systems.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing FIGURE in which the single FIGURE is a schematic illustration of a laser system for joining a bimetallic material to a circuit breaker terminal and a braid extension, according the present invention.

DETAILED DESCRIPTION OF THE INVENTION

With reference to FIG. 1, there is illustrated laser dissimilar material joining system 2. System 2 includes, in part, terminal 4, bimetal connection 6, braid extension 8, laser beams 10, gas source nozzle 14, gas 16, and weldments 18 and 20. In particular, terminal 4, preferably, is constructed of phosphor bronze. Connection 6, preferably, is constructed of a nickel(34)-iron(64)-nickel alloy bimetal. Braid extension 8, preferably, is constructed of any suitable tinned or non-tinned brass. Laser beam 10, preferably, is formed by a conventional Nd:YAG laser that operates with and without a fiber optic beam delivery system. Nozzle 14, preferably, is a conventional inert gas nozzle. Gas 16, preferably, is any suitable inert gas, such as, $N_2$.

During the operation of system 2, terminal 4 is rigidly held to one end of bimetal connection 6 by a conventional clamp (not shown). Braid extension 8 is also rigidly held to bimetal connection 6 by a clamp (not shown). After terminal 4 and braid extension 8 are clamped to bimetal connection 6, this subassembly is moved past laser beams 10 and along the direction of arrow X. It is to be understood that this subassembly can remain stationary and laser beam 10 can move across this subassembly. As this subassembly moves past laser beams 10, a conventional laser (not shown) which is operating at pulse lengths between 7-9 ms, a frequency (pulse rate) of 5 pps, an energy of 30 J/pulse, and a speed of 50 mm/min. produces laser beams 10 which first contact the area where terminal 4 and bimetal connection 6 are held. As the subassembly is traversed along laser beam 10 in the direction of arrow X, weldment 18 is formed. This subassembly continues to move along the direction of X until the area where bimetal connection 6 and braid extension 8 are held together contacts laser beam 10. At this time, weldment 20 begins to form between braid extension 8 and connection 6.

As can be seen, this approach allows the operator to autogenously edge weld components of circuit breakers that are made of dissimilar materials. This structurally sound weld is accomplished by providing mixing of the materials in the weld zone, even though, the weldability of the materials of the components of the circuit breakers is not at all good. The use of a laser allows for some mixing by varying the pulse length. Using the laser in the pulse mode provides for higher peak energy and subsequent deeper weld penetration than a continuous wave laser. The pulse mode is important when addressing high thermal conductivity materials such as bronze and brass. Overlapping laser spot welds are used to make a continuous edge weld of the required length. It is to be understood, that the two edge welds 18 and 20 could be made simultaneously by this system 2. By providing a mode of mixing and minimizing oxidation effects through the use of the nitrogen gas 16, joint ductility is increased, thus decreasing the propensity for brittle failure during a conventional bending test or when in operation.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. An apparatus for joining circuit breaker components, said apparatus comprised of:
   a circuit breaker terminal means;
   a braid extension means located at a predetermined distance away from said terminal means;
   a bimetal connection means located between said terminal means and said extension means wherein said bimetal is further comprised of a nickel(34)-iron(64)-nickel Δ based alloy bimetal;
   a laser means; and
   a first and second joint means, wherein said first joint means is substantially located between said terminal means and said bimetal connection means such that said first joint means is formed by said laser means and is constructed substantially of a portion of said terminal means and a portion of said bimetal connection means and said second joint means is substantially located between said braid extension means and bimetal connection means such that said second joint means is formed by said laser means and is constructed substantially of a portion of said braid extension means and a portion of said bimetal connection means.

2. The apparatus, as in claim 1, wherein said terminal means is further comprised of:
   phosphor bronze.

3. The apparatus, as in claim 1, wherein said extension means is further comprised of:
   tinned or non-tinned brass.

4. The apparatus, as in claim 1, wherein said laser means is further comprised of:
   a Nd:YAG laser.

5. The apparatus, as in claim 1, wherein said first and second joint means are further comprised of:
   edge weldments.

6. A method for joining circuit breaker components including a circuit breaker terminal means, a braid extension means, a bimetal connection means, a laser means, wherein said method is comprised of the steps of:
   retaining said terminal means to said connection means;
   retaining said extension means to said connection means such that said extension means is located at a predetermined distance from said terminal means;
   operating said laser means;
   traversing said laser means past said terminal means and said connection means to form a first joint means which is constructed substantially of a portion of said terminal means and said connection means wherein said steps of traversing said laser means is further comprised of the step of traversing said laser means at approximately 50 mm/min.; and
   traversing said laser means past said extension means and said connection means to form a second joint means which is constructed substantially of a portion of said extension means and a portion of said connection means wherein said steps of traversing said laser means is further comprised of the step of traversing said laser means at approximately 50 mm/min.

7. The method, as in claim 6, wherein said step of operating said laser means is further comprised of the steps of:
   operating an oxidation reduction means;
   pulsing said laser system to approximately 7-9 ms;
   operating said laser system at a frequency of approximately 5 pps; and
   operating said laser system at an energy of approximately 30 J/pulse.

* * * * *